United States Patent [19]

Kita et al.

[11] 4,083,415

[45] Apr. 11, 1978

[54] MINING BIT WITH REPLACEABLE WORK ENGAGING MEMBER

[75] Inventors: John F. Kita, Bedford; Ray C. MacIntyre, Alum Bank, both of Pa.

[73] Assignee: Kennametal Inc., Latrobe, Pa.

[21] Appl. No.: 642,134

[22] Filed: Dec. 18, 1975

[51] Int. Cl.² .............................................. E21B 9/35
[52] U.S. Cl. ................................... 173/132; 175/400; 175/410; 175/415; 175/417; 403/316
[58] Field of Search .............. 175/400, 410, 414–420; 299/94; 173/131, 132; 403/316, 318, 362

[56] References Cited

U.S. PATENT DOCUMENTS

| | | | |
|---|---|---|---|
| 1,523,932 | 1/1925 | Davies | 403/362 |
| 1,922,559 | 8/1933 | Strobel | 175/417 |
| 2,158,120 | 5/1939 | Hirshberg | 175/417 |
| 2,215,948 | 9/1940 | Williams | 175/417 X |
| 2,716,564 | 8/1955 | Löfquist | 175/417 X |
| 3,103,367 | 9/1963 | Peck | 173/132 X |
| 3,429,390 | 2/1969 | Bennett | 175/343 |
| 3,521,716 | 7/1970 | Fisher | 175/417 |

*Primary Examiner*—Ernest R. Purser
*Assistant Examiner*—William F. Pate, III
*Attorney, Agent, or Firm*—Lawrence R. Burns

[57] ABSTRACT

A mining bit, especially an impact bit for down-the-hole operations and the like, in which the bit comprises a body adapted for being chucked in an impact motor for being impacted by the hammer of the motor and for being rotated by the motor. The working end of the bit includes a detachable cup-shaped cap in which hard wear resistant inserts are mounted.

9 Claims, 5 Drawing Figures

MINING BIT WITH REPLACEABLE WORK ENGAGING MEMBER

The present invention relates to mining bits, especially to impact bits for down-the-hole operations and the like, and is particularly concerned with a bit of the nature referred to in which the working end of the bit is replaceable.

The working end of the bit is in the form of a cup-shaped cap member which is detachably mounted on the body of the bit so that, when the cap member becomes worn or broken, it can be replaced on the bit body.

The present invention relates to mining bits, especially to impact bits for down-the-hole operations, and is particularly concerned with such a bit in which the working end is detachable and can be replaced.

Mining bits of the nature with which the present invention is concerned comprise a steel body of substantial size adapted for being impacted at one end by a hammer while, at the other end, the bit is provided with hard wear resistant inserts for reduction of hard formations such as rocks.

It is usually the case that failure of such a bit occurs at the working end, either through loss of the hard wear resistant inserts, or breakage thereof, or fracturing of the working end of the body. It is often the case that the main part of the bit body is still in usable condition when the working end of the bit has ceased to be efficient.

With the foregoing in mind, the present invention proposes an arrangement wherein the working end of a bit of the nature referred to can be replaced so that the main body portion of the bit can be used more than once.

Another object is the provision of a mining bit having a detachable working end in which the connection of the working end to the bit body is extremely rigid.

Another object is the provision of a mining bit of the nature referred to in which the working end is in the form of a replaceable cap and the connecting means which detachably connects the cap to the body is so arranged that rotation of the bit in the hole will retain the cap tight on the body.

BRIEF SUMMARY OF THE INVENTION

According to the present invention, a mining bit is provided having one end adapted for engagement by a hammer while the other end is adapted for engaging a formation to be reduced. According to the present invention, the other end of the body is in the form of a cup-shaped cap and the lower end of the bit body is configured to be received inside the cap.

Radial screws in the skirt portion of the cap are provided and the lower end of the bit body is provided with recesses and balls placed in the radial holes are forced inwardly by screws into engagement with the recesses.

Each recess has a lower wall which inclines upwardly in the radially inward direction and which is engaged by the respective ball so that the cap is forced axially into firm bearing engagement with the lower end of the bit body for transmitting impacts from the bit body into the cap member.

The recesses referred to may take the form of an annular groove formed in the lower end of the bit body or individual recesses for receiving the respective balls.

When individual recesses are provided for the respective balls, the recesses may be inclined in circumferential direction in such a direction that rotation of the bit in the hole being formed thereby will hold the cap member tight on the lower end of the bit body.

The exact nature of the present invention will become more clearly apparent upon reference to the following detailed specification taken in connection with the accompanying drawings in which.

DETAILED DESCRIPTION OF THE INVENTION

Figure 1:
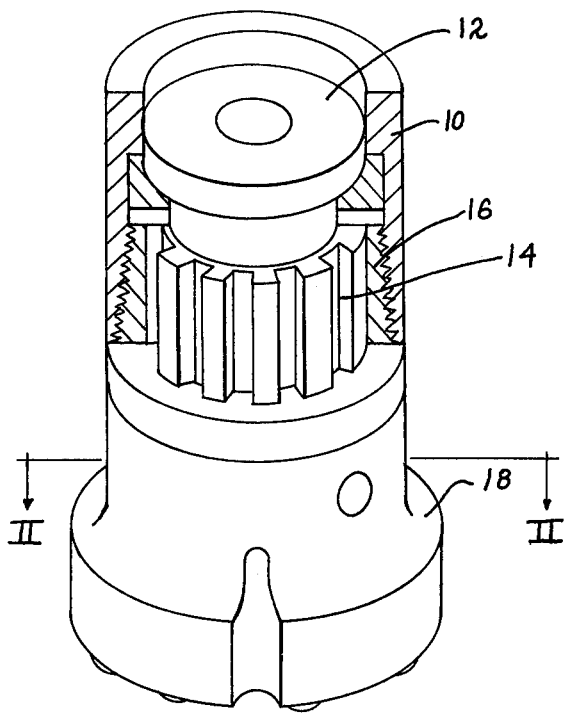
FIG. 1 is a somewhat schematic perspective view showing a bit according to the present invention mounted in the lower end of an impact tool.

Referring to the drawings somewhat more in detail, the lower end of an impact motor is indicated at 10 in FIG. 1. The bit according to the present invention has a body 12 and includes a splined region 14 on the body engageable by a splined sleeve 16 threaded into the lower end of motor 10.

The bit has a lower working portion 18 adapted for contacting the formation to be reduced. The motor 10 includes a hammer which impacts on the upper end of the body 12 for driving the bit against the formation while motor 10 is rotatable for rotating the bit while it is in engagement with the work.

Figure 2:
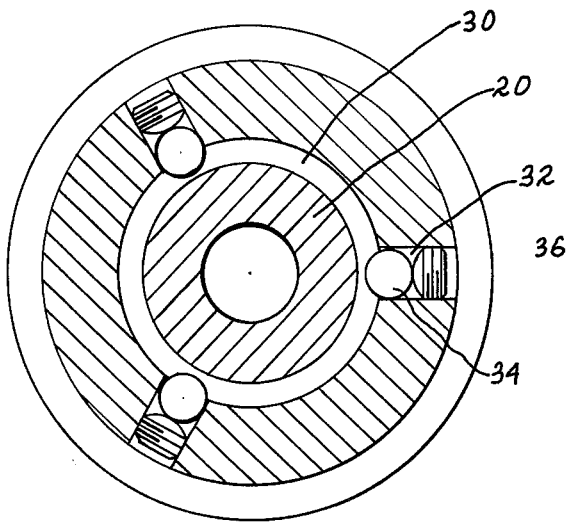
FIG. 2 is a transverse sectional view indicated by line II—II on FIG. 1.
Figure 3:
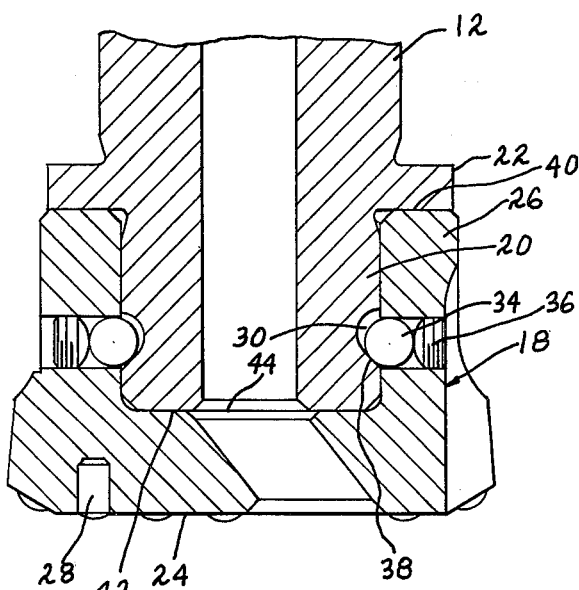
FIG. 3 is a vertical sectional view indicated by line III—III on FIG. 2.
Figure 4:
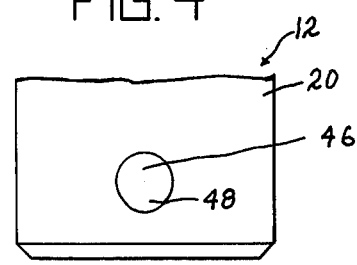
FIG. 4 is a side view of the lower end of the bit body showing an individual recess for receiving a ball.
Figure 5:
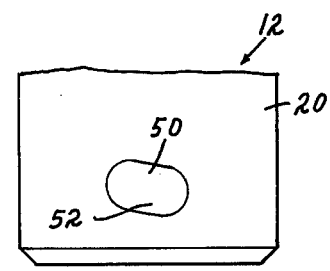
FIG. 5 is a view like FIG. 4 but showing an individual recess for receiving a ball and inclined in the circumferential direction of the bit body.

As will be seen in FIGS. 2 and 3, the lower end of bit body 12 has a reduced diameter portion 20 and a radial flange 22 at the upper end of reduced diameter portion 20. The cap 18 referred to mounted on the lower end of the bit body has a lower wall 24 and a skirt portion 26 upstanding from the periphery of the lower wall 24. Hard wear resistant inserts 28 are imbedded in the bottom of cap member 24 and may be formed of cemented hard metal carbide such as tungsten carbide.

For retaining cap 18 in place, reduced diameter portion 20 of the bit may be annularly grooved as at 30 and skirt 26 of cap 18 may be provided with radial bores 32, each of which has therein a ball 34 adapted to be pressed radially inwardly by a screw 36.

As will best be seen in FIG. 3, the lower side of groove 30 has an upwardly and inwardly inclined wall region 38 engaged by the balls 34 so that, when the balls are pressed radially inwardly by screws 36, cap 18 will be forced upwardly on bit body 12.

The flange 22 presents a downwardly facing shoulder engageable by the upwardly facing surface 40 on the upper end of skirt 26 of cap 18 or the lower end of bit body 12 may present a downwardly facing surface 42 which engages the upwardly facing upper side 44 of lower wall 24 of the cap member 18. Either one or the other, or both, of the abutment regions are provided, and in this manner, impacts delivered to bit body 12 are efficiently transmitted to the lower wall portion of cap member 18.

Rather than annularly groove the reduced diameter lower portion 20 of bit body 12, individual recesses 46 may be provided for the balls with each thereof having an upwardly and inwardly inclined lower wall region 48 for engagement by the respective ball.

Still further, the reduced diameter portion 20 of the bit body may include elongated recesses 50 for engagement by the respective balls with each recess 50 having an upwardly and inwardly inclined lower surface 52. The peripherally elongated recesses 50 are inclined in such a direction that rotation of the bit in the hole will maintain the cap member tight thereon at all times.

It will be evident that the rotation of the bit in the hole is in the clockwise direction as viewed upwardly from the bottom of the bit so that any circumferential shifting of cap member 18 on the bit body will increase the tightness with which the cap member bears on the lower end of the bit body.

By the practice of the present invention, it becomes possible to renew a bit body by replacing the cap member on the working end thereof and the cap member becomes ineffective for reducing formations. Alternatively, bit bodies which have been worn out can be turned down to form a reduced diameter lower portion thereon to fit within a cap member and, by the provision of a suitable groove or recesses in the turned down lower portion, a cap member can be placed on a used bit body of a substantially conventional nature and the bit thereby restored to effective operating condition.

Modifications may be made within the scope of the appended claims.

What is claimed is:

1. In a mining bit; a bit body having an upper end and a lower end, means on the upper end of the body for engagement by a motor for impacting the body and for rotating the body, a cup-shaped cap member on the lower end of the body having a lower wall and a peripheral skirt upstanding from the periphery of said lower wall, said cap member adapted for engagement with a formation to be reduced by the bit, interengaged elements of abutment means on the body and cap member to transmit impact loads therebetween, said elements of abutment means including a radial flange on said body presenting a downwardly facing annular shoulder and the upper end of said skirt of said cap member which presents an upwardly facing annular surface for engagement by said shoulder, and radially movable cooperating elements of releasable connector means on the cap member, individual recesses formed on the lower end of said body and cooperating with said radially movable elements so as to wedge said cap axially against said body and hold said cap nonrotatable relative to said body.

2. A mining bit according to claim 1 in which said elements of abutment means include the downwardly facing lower extremity of said body and the upwardly facing upper side of said lower wall of said cap member.

3. A mining bit according to claim 1 which includes hard wear resistant inserts imbedded into at least the lower side of the said lower wall of said cap member.

4. A mining bit according to claim 1 which includes an axial passage extending through said body and a passage through said lower wall of said cap member in communication therewith.

5. In a mining bit; a bit body having an upper end and a lower end, means on the upper end of the body for engagement by a motor for impacting the body and for rotating the body, a cup-shaped cap member on the lower end of the body having a lower wall and a peripheral skirt upstanding from the periphery of said lower wall, said cap member adapted for engagement with a formation to be reduced by the bit, interengaged elements of abutment means on the body and cap member to transmit impact loads therebetween, and radially movable cooperating elements of releasable connector means on the cap member, including radial holes in the skirt portions of said cap member, a ball element in each hole, a screw threaded into each hole to force the respective ball inwardly in the hole, and individual recess means formed in said bit body for engagement by said balls and including upwardly inclined wall means which the balls engage for forcing said elements of abutment means into interengagement.

6. A mining bit according to claim 5 in which said inclined wall means forms an angle of about 45° with the axis of the bit body.

7. A mining bit according to claim 5 in which said recess means comprises an annular groove in said body.

8. A mining bit according to claim 5 in which said recess means comprises a recess for each ball.

9. A mining bit according to claim 7 in which the bottom wall means of each recess inclines downwardly in the direction of rotation of the bit.

* * * * *